(12) United States Patent
Helmschmidt et al.

(10) Patent No.: US 8,395,911 B2
(45) Date of Patent: Mar. 12, 2013

(54) CIRCUIT CONFIGURATION FOR OPERATING A HOUSEHOLD APPLIANCE

(75) Inventors: Holger Helmschmidt, Regensburg (DE); Anton Hertlein, Herrieden (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 428 days.

(21) Appl. No.: 12/742,927

(22) PCT Filed: Nov. 5, 2008

(86) PCT No.: PCT/EP2008/064999
§ 371 (c)(1), (2), (4) Date: May 14, 2010

(87) PCT Pub. No.: WO2009/071410
PCT Pub. Date: Jun. 11, 2009

(65) Prior Publication Data
US 2010/0292862 A1 Nov. 18, 2010

(30) Foreign Application Priority Data

Dec. 5, 2007 (DE) .......................... 10 2007 058 377

(51) Int. Cl.
*H02M 3/335* (2006.01)
(52) U.S. Cl. .......................... 363/18; 363/21.16; 323/239
(58) Field of Classification Search .............. 363/16–20, 363/21.01, 21.13, 21.16, 21.17, 21.18, 41, 363/97, 98, 49, 56.12; 307/64, 66, 67, 71, 307/140, 127, 141, 150; 323/222, 235, 237, 323/239, 245, 300
See application file for complete search history.

(56) References Cited

U.S. PATENT DOCUMENTS

| 3,624,484 | A | | 11/1971 | Colyer |
| 3,743,918 | A | | 7/1973 | Maitre |
| 4,385,347 | A | * | 5/1983 | Takematsu ...................... 363/49 |
| 4,479,076 | A | | 10/1984 | Yamaoka et al. |
| 4,737,898 | A | * | 4/1988 | Banfalvi .......................... 363/19 |
| 5,089,752 | A | * | 2/1992 | Pacholok ....................... 315/307 |
| 5,751,560 | A | * | 5/1998 | Yokoyama ....................... 363/18 |
| 6,496,390 | B2 | * | 12/2002 | Yang ......................... 363/21.07 |
| 6,853,563 | B1 | * | 2/2005 | Yang et al. .................. 363/21.15 |
| 7,248,485 | B2 | | 7/2007 | Hermann et al. |
| 7,365,996 | B2 | | 4/2008 | Schonleitner et al. |
| 7,504,749 | B2 | * | 3/2009 | Von Seidel .................... 307/131 |
| 2009/0153236 | A1 | | 6/2009 | Kneepkens et al. |

FOREIGN PATENT DOCUMENTS

DE 19530594 C1 9/1996
(Continued)

OTHER PUBLICATIONS

National Search Report CN 200880119195.4.

*Primary Examiner* — Rajnikant Patel
(74) *Attorney, Agent, or Firm* — James E. Howard; Andre Pallapies

(57) ABSTRACT

A circuit for operating a household appliance includes a controller that controls processes of a household appliance, a switching power supply that supplies current to the controller, a pushbutton that couples the switching power supply to a supply grid, an electronic controller connected parallel to the pushbutton that is actuable by the switching power supply by a control connection, and a voltage storage connected between the control connection of the electronic controller and a reference potential.

21 Claims, 1 Drawing Sheet

FOREIGN PATENT DOCUMENTS

| | | |
|---|---|---|
| EP | 0893870 A2 | 1/1999 |
| EP | 0893870 A3 | 2/2000 |
| GB | 2067032 A | 7/1981 |
| WO | 9804030 | 1/1998 |

* cited by examiner

CIRCUIT CONFIGURATION FOR OPERATING A HOUSEHOLD APPLIANCE

BACKGROUND OF THE INVENTION

The present invention relates to a circuit configuration for operating a household appliance, having a switching power supply, by means of which a control unit can be at least indirectly supplied with current for controlling processes of the household appliance, and having a pushbutton, by means of which the switching power supply can be coupled to a supply grid. The invention further relates to a corresponding method.

Such circuit arrangements are already known from the prior art. In order to generate required low voltages, for example 12, 9, 5, 3.3 volts, these circuit configurations normally include a switching power supply, by means of which a line voltage from a supply grid is converted into the aforementioned DC supply voltage. As a general rule, such circuit configurations furthermore have a control unit which is coupled indirectly or directly to the switching power supply and enables the control of processes of the household appliance and the operation of the circuit configurations.

A method and a device for reducing the energy consumption in the case of an electrical appliance fed by a voltage converter are known from the publication DE 195 30 594 C1. In this situation, during operation of the appliance the voltage converter is connected on the primary side for only short periods of time to the supply grid or to another electrical supply. During these periods of time, in addition to providing the supply for a possibly required appliance function the voltage converter also enables the charging of a suitable energy store, whereby in the periods of time during which the voltage converter is disconnected from the power supply the function of the appliance is assured by drawing energy from the energy store. The voltage converter is automatically connected to the supply grid as soon as the energy supply in the energy store runs short in order to charge said energy store or if the appliance function otherwise requires it.

To be regarded as a disadvantage associated with this known method, or this device, is the fact that during the periods of time in which the voltage converter is disconnected from the power supply a self-sustaining behavior of the device in the event of an extended power outage is no longer assured, as a result of which only an inadequate principle of operation is made possible.

BRIEF SUMMARY OF THE INVENTION

The object of the present invention consists in proposing a circuit configuration and also a method for operating a household appliance, wherein in each case, in addition to energy-efficient operation of the household appliance, reliable self-sustaining behavior is ensured, in particular in the event of a power outage.

A circuit configuration according to the invention for operating a household appliance comprises a switching power supply by means of which a control unit for controlling processes of the household appliance can be at least indirectly supplied with current, and a pushbutton by means of which the switching power supply can be coupled to a supply grid, whereby an electrical control element is connected in parallel with the pushbutton and can be actuated at least indirectly by the switching power supply by way of a control connection, and a voltage storage unit is connected between the control connection of the electronic control element and a reference potential. Household appliances here are understood in particular to be electrical appliances having an automatically executing program, which are used for housekeeping purposes, such as for example washing machines, clothes dryers, dishwashers or cooking appliances which are designed to execute cooking programs.

In particular, the pushbutton can be activated by a person operating the household appliance and is designed such that after being activated it returns automatically into its initial position and thus closes the electric circuit in pulsed fashion. In other words, a fundamental idea underlying the invention consists in the fact that an electronic control element, in particular a transistor, bridges the pushbutton through being arranged in parallel with the pushbutton as soon as a voltage delivered by the switching power supply is present at a control connection following an activation of the pushbutton. In this manner, after the switching power supply has been briefly provided with power in pulsed fashion by means of the pushbutton, this ensures that the switching power supply is supplied with current by way of the control element connected in parallel with the pushbutton. Through the intelligent use of a voltage storage unit which is coupled between the control connection and a reference potential and can be charged during operation, this means that even in the event of a power outage on the side of the supply grid, on return of the line voltage the electronic control element is actuated directly and the switching power supply is fed with current. In particular, on account of the aptly designed voltage storage unit it becomes possible with a minimum of effort to reduce the electronics to a power consumption of 0 watts in the turned-off state.

The electronic control element is preferably a FET (field effect transistor), in particular a MOS-FET, and the control connection is a gate pole. By this means, lossless operation of the household appliance and also reliable switching and self-sustaining behavior are made possible.

By preference, the voltage storage unit is a buffer capacitor, a battery or an accumulator. In particular, when a buffer capacitor is used a rapid charging or a specific discharging is ensured.

In one embodiment variant, a voltage limiting diode is connected between the control connection and the reference potential in parallel with the voltage storage unit. By preference, a discharge resistor is connected between the control connection and the reference potential in parallel with the voltage storage unit. Use of the voltage limiting diode means that the voltage present at the control connection cannot exceed a particular limit value. This serves to ensure that for reasons of safety the current flowing through the control element and feeding the switching power supply can only rise within certain limitations.

According to one embodiment variant, the circuit configuration has associated with it a transformer, the primary winding of which is coupled to the switching power supply and the secondary winding of which is coupled to an electronics unit, in particular to the control unit of the household appliance, whereby an auxiliary winding is provided, by means of which the electronic control element can be actuated by the switching power supply. The transformer makes it possible, on the one hand, to feed an electronics unit, in particular the control unit, with a required low voltage by way of the secondary winding and, on the other hand, to actuate the electronic control element by way of the auxiliary winding and thus to provide for the self-sustaining behavior of the circuit configuration.

By preference, a rectifying diode and a resistor are connected between the auxiliary winding and the control connection of the electronic control element, whereby the auxiliary winding is preferably designed for a control voltage, in particular a gate-to-source voltage. This control voltage can for example be 10 volts. A rectification of the voltage present at the control connection of the control element is achieved by means of the power supply including the rectifying diode and the resistor, and ensures that exclusively a positive voltage can occur at the control connection. When the switching power supply is in operation, the electronic control element is actuated directly by way of the auxiliary winding and the feed to the switching power supply is self-sustaining. In particular, in order to actuate an enhancement transistor a voltage is required at the control connection, in particular a gate pole, whereby said voltage is component-dependent and can preferably be 10 volts. In particular, the required control voltage can be generated by increasing the winding voltage of the auxiliary winding, or by using a voltage doubler circuit. It is especially important that an adequate control voltage is made available at the control connection of the electronic control element in order to enable the control element to be actuated.

By preference, a switch is provided by means of which the control connection can be coupled to a reference potential, whereby the switch can preferably be actuated by the control unit. In particular, the switch is connected in parallel with the voltage storage unit. When the switch is closed, then the control connection is coupled to the reference potential and the voltage storage unit is discharged. In particular, by this means, after a process of the household appliance has been completed the control connection can be shorted with the reference potential and the switching power supply can thus be turned off by inhibiting the current feed. This serves to ensure that when the household appliance is in the turned-off state the switching power supply is unable to accept any further active current.

In one embodiment variant, an activation of the pushbutton during operation of the household appliance can be recognized by the control unit. In particular, the control unit receives a signal which can be evaluated with regard to the activation of the pushbutton. By this means, it becomes possible for an operator to turn off the household appliance at any time.

As described above, use of the circuit configuration means that in the event of a grid power failure the operational state of the switching power supply is maintained by the voltage storage unit. After the line voltage is restored the switching power supply restarts on account of the voltage present at the control connection and stored by the voltage storage unit. The duration of the bridging is determined in particular by the size of the capacitor, the rate of self-discharge and further component-specific variables of the voltage storage unit and the value of the discharge resistor. In addition, an auto shut off function of the household appliance is made possible by the control unit and also the switch. Moreover, the circuit configuration has a power consumption of 0 watts in the turned-off state. Furthermore, the circuit configuration ensures that power failures are bridged with little effort.

A method according to the invention is designed for operating a household appliance with a circuit configuration. In this situation, the circuit configuration has a switching power supply, by means of which a control unit is indirectly supplied with current for controlling processes of the household appliance. Depending on the activation of a pushbutton, the switching power supply is coupled to a supply grid, whereby an electronic control element connected in parallel with the pushbutton is provided, which is at least indirectly actuated by the switching power supply by way of a control connection, and the electrical voltage present at the control connection is stored by means of a voltage storage unit connected between the control connection of the electronic control element and a reference potential.

With regard to the method, the electronic control element is preferably a FET, in particular a MOS-FET, and the control connection is a gate pole.

By preference, the circuit configuration has associated with it a transformer, the primary winding of which is coupled to the switching power supply and the secondary winding of which is coupled to an electronics unit, in particular to the control unit of the household appliance, whereby the electronic control element is actuated by the switching power supply by way of an auxiliary winding of the transformer.

With regard to the method, the auxiliary winding is preferably designed for a control voltage, in particular a gate-to-source voltage. This control voltage is component-dependent and can preferably be 10 volts.

The control connection is preferably coupled to a reference potential by means of a switch, whereby the switch is preferably actuated by the control unit.

With regard to the method, an activation of the pushbutton during operation of the household appliance is recognized by the control unit.

The preferred embodiments presented in respect of the circuit configuration according to the invention and in particular their advantages apply correspondingly to the method according to the invention.

BRIEF DESCRIPTION OF THE DRAWINGS

Further advantages, features and details of the invention will emerge from the description which follows of a preferred exemplary embodiment and with reference to the drawings. In the drawings.

DETAILED DESCRIPTION OF EXEMPLARY EMBODIMENTS OF THE PRESENT INVENTION

Figure 1:
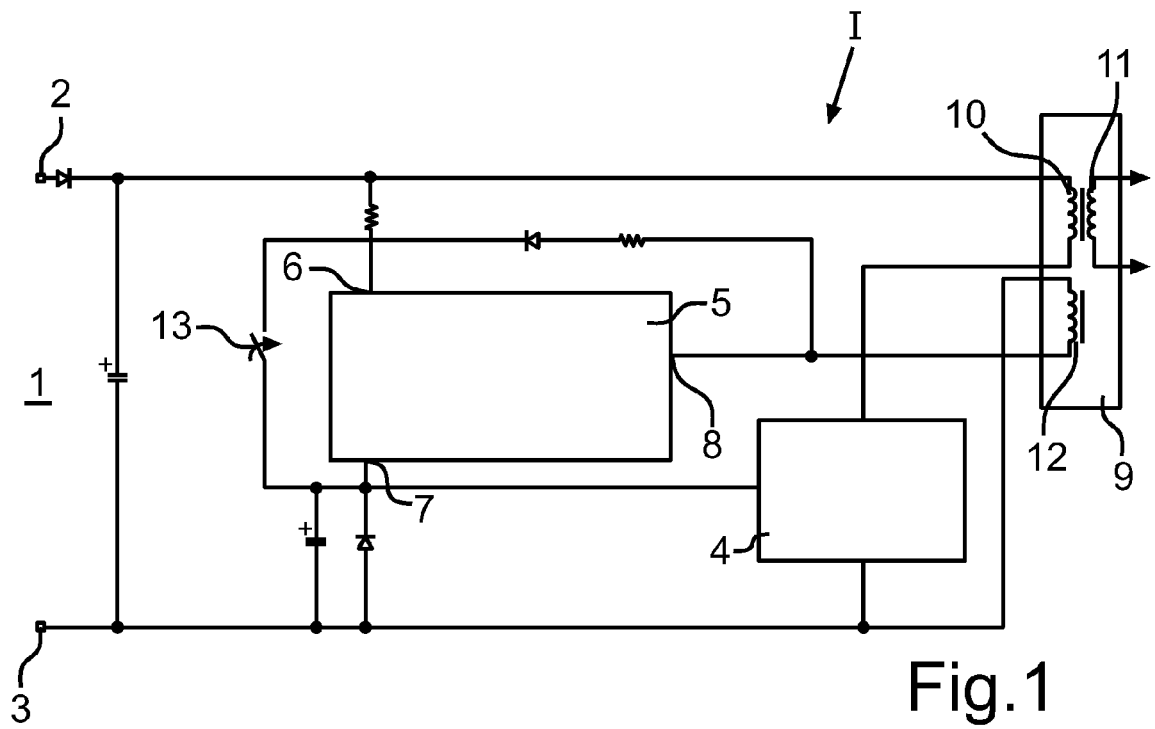
FIG. 1 shows a schematic block diagram of a circuit configuration in accordance with a preferred exemplary embodiment of the invention.

The same elements and elements having the same function are identified by the same reference characters in the figures.

A circuit configuration I illustrated in part schematically in FIG. 1 comprises an input 1, including a phase conductor pole 2 and a neutral conductor pole 3, connected to a supply grid. A line voltage is thus present between the phase conductor pole 2 and the neutral conductor pole 3. The circuit configuration I represented is designed for operating a household appliance and includes a switching power supply 4 which is designed to convert the line voltage into a DC supply voltage in order to feed a control unit (not shown), a microcontroller for example, for controlling processes of the household appliance. In this situation, the household appliance can in particular be a washing machine, a dryer or a washer dryer.

The circuit configuration I has a self-sustaining circuit 5 illustrated schematically in FIG. 1, which comprises two connection electrodes 6, 7 and also a control connection 8. The self-sustaining circuit 5 is coupled by way of the control connection 8 and also a transformer 9 to the switching power supply 4. Furthermore, the self-sustaining circuit 5 is coupled by way of the connection electrodes 6, 7 on the one hand to the phase conductor pole 2 and on the other hand to the neutral conductor pole 3. The neutral conductor pole 3 in this case constitutes a reference potential and is referred to in the following as reference potential. The self-sustaining circuit 5 is designed in such a manner that the current flow between the two connection electrodes 6, 7 is controlled by means of a control voltage present at the control connection 8. When an electrical voltage is present at the control connection 8, current then flows through the connection electrodes 6, 7.

The transformer 9 comprises a primary winding 10 which is coupled to the phase conductor pole 2 and also by way of the switching power supply 4 to the reference potential 3, and a secondary winding 11 by way of which the control unit of the household appliance or an electronics unit is fed with a DC supply voltage. Furthermore, the transformer 9 has an auxiliary winding 12 which is coupled to the control connection 8 of the self-sustaining circuit 5. When the switching power supply 4 is energized, then current flows by way of the primary winding 10 and thus by way of the auxiliary winding 12, such that the self-sustaining circuit 5 is actuated by way of the control connection 8.

The circuit configuration I also includes a pushbutton 13 which in this case can be activated by an operator of the household appliance. The pushbutton 13 is designed in such a manner that after being activated it returns into its initial position, with the result that the electric circuit is closed in pulsed fashion.

Figure 2:
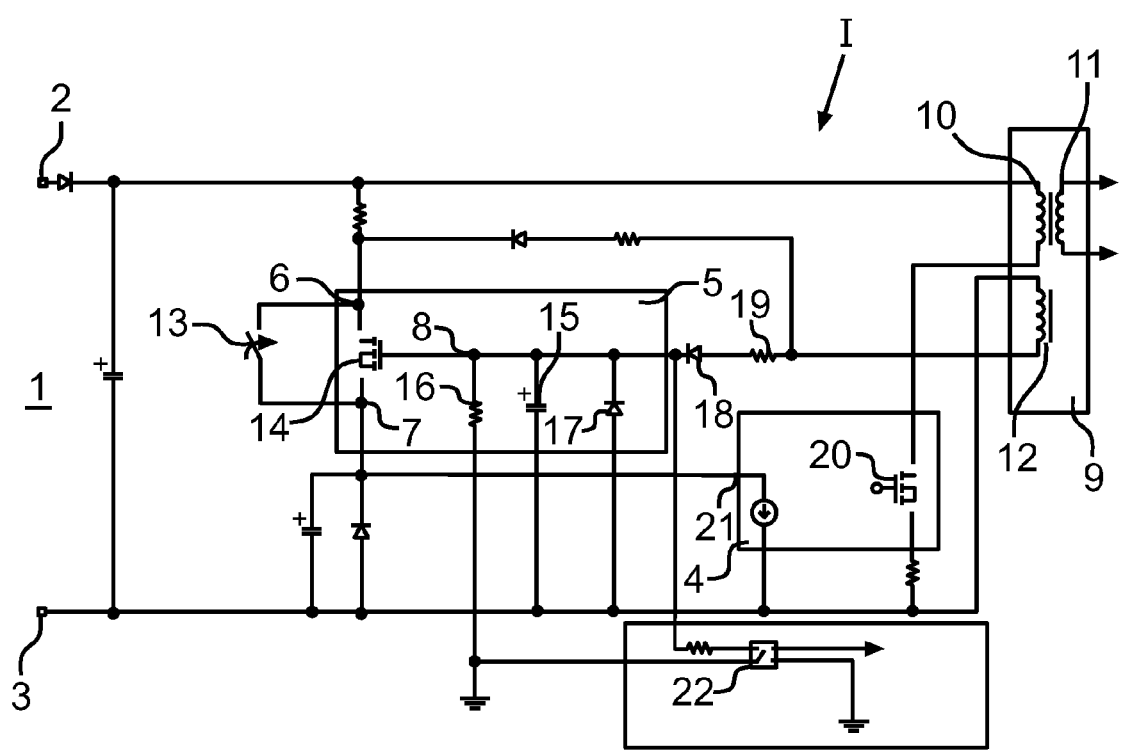
FIG. 2 shows the circuit configuration in accordance with the exemplary embodiment.

A possible embodiment of the circuit configuration I represented in FIG. 1 is illustrated in FIG. 2. As shown in FIG. 2, the self-sustaining circuit 5 includes an electronic control element 14 which in this case is designed as a field effect transistor, in particular a MOS-FET. The connection electrodes 6, 7 of the self-sustaining circuit 5 thus accordingly constitute a drain pole and a source pole respectively of the transistor 14. The control connection 8 is a gate pole of the transistor 14. The self-sustaining circuit 5 also has, coupling the control connection 8 to the reference potential 3, a voltage storage unit 15 which in this case is designed as a buffer capacitor. Connected in parallel with the voltage storage unit 15 are a discharge resistor 16 and also a voltage limiting diode 17, whereby the voltage present at the control connection 8 can be limited by means of the voltage limiting diode 17 for the sake of safety. The discharge resistor 16 determines the rate of self-discharge of the voltage storage unit 15.

The control connection 8 is now coupled to the auxiliary winding 12 of the transformer 9 by way of a rectifying diode 18 and also a resistor 19 connected in series therewith. This small power supply including the rectifying diode 18 and the resistor 19 serves the function of rectifying the voltage present at the control connection 8. This serves to ensure that exclusively a positive voltage can occur at the control connection 8.

The switching power supply 4 includes a transistor 20 represented schematically in FIG. 2, by means of which the current flow across the primary winding 10 is controlled by way of a control electrode 21. When an electrical voltage is present at the control electrode 21, then current flows across the transistor 20.

The circuit configuration I also has a switch 22 which can be actuated by the control unit of the household appliance, and by means of which the capability is provided to discharge the voltage storage unit 15. To this end, the switch 22 is coupled on the one hand to the control connection 8 of the electronic control element 14 and on the other hand to the reference potential 3. When the switch 22 is closed, then the control connection 8 is shorted with the reference potential 3. This serves to ensure that the voltage storage unit 15 can be discharged at any time by closing the switch 22.

The mode of operation of the circuit configuration I in accordance with the exemplary embodiment will be described in detail in the following. When the pushbutton 13 is activated by an operator and thus closed, current then flows by way of the pushbutton 13 and the control electrode 21 of the switching power supply 4. As a result of this voltage present at the switching power supply 4 the transistor 20 of the switching power supply 4 is actuated such that current flows by way of the primary winding 10 of the transformer 9. The auxiliary winding 12 is subsequently energized and the electronic control element 14 is actuated by way of the control connection 8 from the auxiliary winding 12. The electronic control element 14 now becomes low impedance, with the result that the connection electrodes 6, 7 are practically shorted. The pushbutton 13 can now be brought into its initial position (automatically) and the feed to the switching power supply 4 is "self-sustained".

In order to actuate the enhancement MOS-FET a voltage difference of 10 volts (component dependent) is required between the gate pole and the source pole. This can be achieved by increasing the winding voltage of the auxiliary winding 12, or by using a voltage doubler circuit not shown in FIG. 2. It is of great importance that an adequate control voltage is made available for the electronic control element 14.

The objective now is to turn off the switching power supply 4, or the household appliance, after the completion of a process. To this end, the control unit is designed in such a manner that the switch 22 is subsequently closed after the completion of a process of the household appliance. The control connection 8 is thus coupled to the reference potential 3 and the electronic control element 14 consequently blocks the voltage feed to the switching power supply 4. This serves to ensure that the switching power supply 4 is unable to accept any further power. The circuit configuration I is thus characterized by a power consumption of 0 watts in the turned-off state.

If a line voltage outage occurs, then the operational state of the switching power supply 4 is preserved through the apt use of the voltage storage unit 15. This is because voltage is present at the control connection 8 by way of the previously charged voltage storage unit 15, even in the event of failure of the line voltage. After restoration of the line voltage the electronic control element 14 is thus actuated directly and the switching power supply 4 subsequently restarts.

The invention claimed is:

1. A circuit for operating a household appliance, comprising:
   a controller that controls processes of a household appliance;
   a switching power supply that supplies current to the controller;
   a pushbutton that couples the switching power supply to a supply grid;
   an electronic controller connected parallel to the pushbutton that is actuable by the switching power supply by a control connection of the electronic controller; and
   a voltage storage connected between the control connection of the electronic controller and a reference potential.

2. The circuit of claim 1, wherein the electronic control element comprises a MOS-FET, and the control connection comprises a gate pole.

3. The circuit of claim 1, wherein the voltage storage comprises a buffer capacitor, a battery, or an accumulator.

4. The circuit of claim 1, further comprising a voltage limiting diode connected between the control connection and the reference potential in parallel with the voltage storage.

5. A circuit for operating a household appliance, comprising:
- a controller that controls processes of a household appliance;
- a switching power supply that supplies current to the controller;
- a pushbutton that couples the switching power supply to a supply grid;
- an electronic controller connected parallel to the pushbutton that is actuable by the switching power supply by a control connection;
- a voltage storage connected between the control connection of the electronic controller and a reference potential, and
- a discharge resistor connected between the control connection and the reference potential in parallel with the voltage storage.

6. A circuit for operating a household appliance, comprising:
- a controller that controls processes of a household appliance;
- a switching power supply that supplies current to the controller;
- a pushbutton that couples the switching power supply to a supply grid;
- an electronic controller connected parallel to the pushbutton that is actuable by the switching power supply by a control connection;
- a voltage storage connected between the control connection of the electronic controller and a reference potential, and
- a transformer with a primary winding coupled to the switching power supply, a secondary winding coupled to the controller, and an auxiliary winding for actuating the electronic control by the switching power supply.

7. The circuit of claim 6, further comprising a rectifying diode and a resistor connected between the auxiliary winding and the control connection of the electronic controller.

8. The circuit of claim 6, wherein the auxiliary winding is designed for a gate-to-source voltage.

9. The circuit of claim 1, further comprising a switch for coupling the control connection to the reference potential.

10. The circuit of claim 9, wherein the switch can be actuated by the controller.

11. The circuit of claim 1, wherein the controller recognizes activation of the pushbutton.

12. A household appliance comprising:
- a controller that controls processes of a household appliance;
- a switching power supply that supplies current to the controller;
- a pushbutton that couples the switching power supply to a supply grid;
- an electronic controller connected parallel to the pushbutton that is actuable by the switching power supply by a control connection of the electronic controller; and
- a voltage storage connected between the control connection of the electronic controller and a reference potential.

13. A method for operating a household appliance comprising:
- supplying a current to a controller for controlling processes of the household appliance by a switching power supply;
- coupling the switching power supply to a supply grid in response to activation of a pushbutton;
- providing an electronic controller parallel to the pushbutton that is actuable by a the switching power supply by a control connection of the electronic controller; and
- storing electrical voltage at the control connection by a voltage storage connected between the control connection of the electronic controller and a reference potential.

14. The method of claim 13, wherein the electronic control element comprises a MOS-FET, and the control connection comprises a gate pole.

15. The method of claim 13, further comprising:
- providing a transformer with a primary winding coupled to the switching power supply and a secondary winding coupled to the controller; and
- actuating the electronic controller by the switching power supply by the auxiliary winding of the transformer.

16. The method of claim 15, wherein the auxiliary winding is designed for a gate-to-source voltage.

17. The method of claim 13, further comprising coupling the control connection to a reference potential by means of a switch.

18. A household appliance comprising:
- a controller that controls processes of a household appliance;
- a switching power supply that supplies current to the controller;
- a pushbutton that couples the switching power supply to a supply grid;
- an electronic controller connected parallel to the pushbutton that is actuable by the switching power supply by a control connection;
- a voltage storage connected between the control connection of the electronic controller and a reference potential, and
- actuating the switch by the controller.

19. A household appliance comprising:
- a controller that controls processes of a household appliance;
- a switching power supply that supplies current to the controller;
- a pushbutton that couples the switching power supply to a supply grid;
- an electronic controller connected parallel to the pushbutton that is actuable by the switching power supply by a control connection;
- a voltage storage connected between the control connection of the electronic controller and a reference potential, and
- recognizing an activation of the pushbutton during operation of the household appliance by the controller.

20. An electrical circuit to operate a household appliance comprising:
- a switching power supply that supplies current to the household appliance;
- a pushbutton coupling the switching power supply to an external power source;
- an electronic controller actuable by the switching power supply, wherein the switching power supply applies an actuating signal to a control connection of the electronic controller and the electronic controller and pushbutton are arranged in parallel, and a voltage storage connected to the control connection to apply an actuating signal to the electronic controller.

21. The circuit of claim 20 wherein the electronic controller comprises a MOS-FET, and the control connection comprises a gate pole to the MOS-FET.

* * * * *